United States Patent Office  
3,175,417  
Patented Mar. 30, 1965

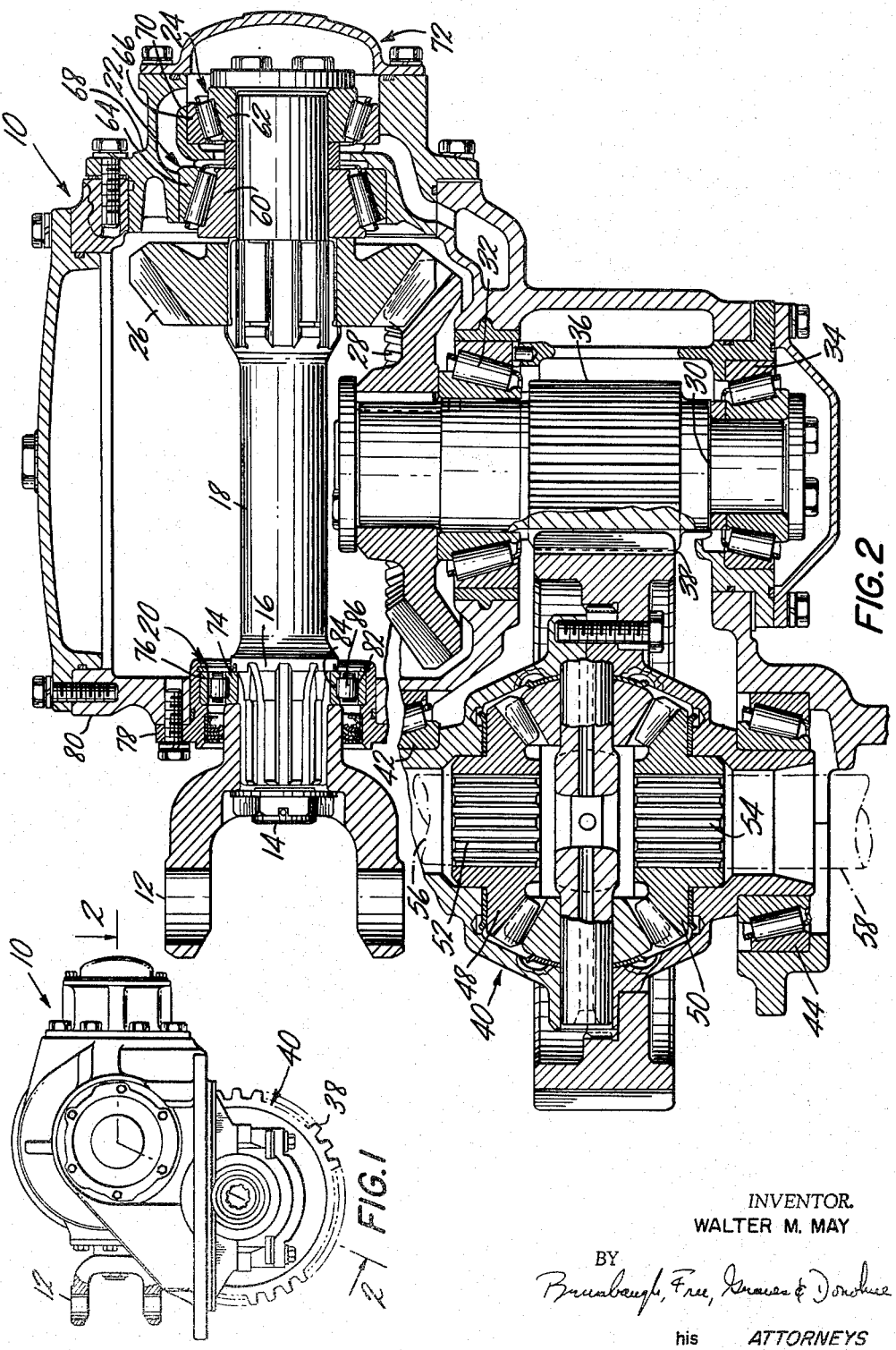

3,175,417
AXLE CARRIER UNIT
Walter M. May, Allentown, Pa., assignor to Mack Trucks, Inc., Plainfield, N.J., a corporation of New York
Filed Nov. 1, 1962, Ser. No. 234,628
2 Claims. (Cl. 74—412)

This invention relates to drive mechanisms for automotive vehicles, and, more particularly, to a top mounted axle carrier unit for coupling the drive shaft of an automotive vehicle to the differential gear arrangement associated with the axle shafts of the vehicle.

There are two basic forms of dual reduction axle carrier units. First, the most common form is the type that mounts on the front of the axle housing, and, second, the form that mounts on the top of the axle housing, commonly found on tandem units and also used on single axles when the shortest possible wheel base is desired on a four wheel truck. The top mounted type is shorter than the front mounted type.

In particular, in double reduction top mounted axle carrier units, the drive shaft of a vehicle is normally coupled to a stub shaft that carries thereon a bevel gear mounted at the forward end of the housing of the carrier unit. The bevel gear meshes with another bevel gear mounted on a cross shaft, the central portion of which is geared to the bull gear of a differential gear mechanism. Typically, to provide accurate positioning of the bevel gear on the stub shaft so that it meshes properly with the bevel gear on the cross shaft, tapered roller bearings are placed at either end of the stub shaft to support and to position the gears accurately. However, this arrangement has not been satisfactory in that it does not maintain proper tooth contact in the bevel gears.

The present invention solves this problem, as well as that of "standout" of the drive shaft yoke which lengthens wheel base, by an arrangement in which the bevel or similar gear on the stub shaft is mounted at the rear end of the shaft remote from the point at which the stub shaft and the drive shaft are coupled together. The rear end of the shaft is supported by a pair of tapered roller bearings which accurately position and restrict longitudinal movement of this portion of the shaft so that the gear thereon properly meshes with the gear on the cross shaft. The forward end of the stub shaft is supported by a simple and small single bearing arrangement which requires a relatively small bearing support and which allows longitudinal movement of this part of the shaft in response to thermal expansion or contraction and other stresses thereon. Thus, the wheel base of the vehicle is shortened, and the effect of thermal or other stresses are effectively eliminated without sacrificing structural support and gear positioning in any way.

Although the invention has been described generally above, a more complete understanding of it may be obtained by consulting the following detailed description and the accompanying drawing, in which:

FIG. 1 is a side view of a top mounted axle carrier unit in accordance with the invention; and FIG. 2 is an enlarged sectional view of the unit shown in FIG. 1, taken along the section line 2—2 of that figure and looking in the directions of the arrows.

Referring to the drawing, a double reduction top mounted axle carrier unit 10 is coupled to a powered vehicle drive shaft (not shown) by a coupling 12. The coupling 12 is attached by a nut 14 to a splined end 16 of a stub shaft 18 forming part of the unit 10. The stub shaft 18 is supported for rotation by a single roller bearing arrangement 20 mounted at the forward end of the shaft and by a pair of tapered roller bearings 22 and 24 mounted at the rear end of the shaft.

The stub shaft 18 carries a bevel gear 26 that is splined thereon adjacent the tapered roller bearings 22 and 24. The bevel gear 26 meshes with another bevel gear 28 that is mounted upon a cross shaft 30. The cross shaft 30 is supported for rotation by a pair of tapered bearings 32 and 34, mounted at opposite ends of the cross shaft, and carries a gear 36 on a mid portion thereof which meshes with the bull gear 38 of a differential mechanism 40.

The differential mechanism 40 is supported for rotation by tapered bearings 42 and 44, and contains the usual pair of bevel gears 48 and 50. Splined portions 52 and 54 of the bevel gears 48 and 50, respectively, mesh with similarly splined axle shafts 56 and 58, respectively, which have been shown only diagrammatically in dotted lines.

Turning to the upper portion of FIG. 2 and examining the arrangement of the stub shaft 18 in detail, the tapered bearings 22 and 24 comprise inner bearing races 60 and 62, respectively, which form a part of the end of the stub shaft. A pair of outer bearing races 64 and 66 are retained in place by bearing caps 68 and 70, respectively. Because of the taper in the bearings 22 and 24, the portion of the stub shaft 18 supported thereby is positioned against radial and longitudinal movement, thereby positioning the bevel gear 26 accurately and ensuring that the gears 26 and 28 mesh together properly. This entire arrangement forms part of a rear housing 72, which because it is to the rear of the cross shaft 30 and the axle shafts 56 and 58, may be made as large as necessary, since it is well out of the way and does not affect the wheel base of the vehicle in any manner.

The bearing arrangement 20 situated at the forward end of the stub shaft 18 comprises an inner race 74 that is attached to the shaft. An outer race 76 is held in place by a bearing cap 78 that is bolted to a portion 80 of the housing 10. As may be seen from the drawing, the outer bearing race 76 has a plane bearing surface 82 which is not indented as is the bearing surface 84 on the inner race 74. For this reason, the stub shaft 18 and the rollers 86 are allowed to move longitudinally. Thus, increase or decrease in the length of the stub shaft 18 due to thermal expansion and contraction, for example, may take place without creating any stresses whatsoever, while at the same time the positioning of the bevel gear 26 is unaffected. Longitudinal movement of the forward end of the stub shaft 18, of course, is taken up by a splined coupling (not shown) that forms part of the drive shaft arrangement.

Because of the simple and relatively short support for the bearing 20 adjacent the coupling 12, the driven axle can be closer to the transmission of the vehicle than was possible heretofore, thereby making the carrier unit particularly suitable for vehicles such as tractor trucks having a wheel base which is limited by load requirements and vehicle regulations as to overall length of the vehicle and its trailer.

Accordingly, a unique top mounted axle carrier unit has been provided which is mechanically strong, space-saving, and stress-free.

From the description above, it is apparent that the invention is subject to modification, which, nonetheless, falls within the scope of the invention. Therefore, the invention should not be deemed limited to the form shown in the drawing.

I claim:

1. A top mounted axle carrier unit for coupling a powered drive shaft to a pair of axle shafts disposed substantially perpendicularly thereto through a differential gear mechanism coupled to said axial shafts, comprising a first elongate rotatable shaft susceptible of longitudinal expansion and contraction mounted between two fixed spaced-apart forward and rearward bearing points, the forward end of said first shaft being coupled to the drive shaft, a first gear mounted on said first shaft adjacent said rearward bearing point, positional bearing means at said rearward bearing point for rotatably supporting said first shaft substantially without longitudinal displacement thereof, second bearing means at said forward bearing point for rotatably supporting said first shaft but enabling longitudinal displacement of said first shaft relative to said forward bearing point upon expansion and contraction of said first shaft, a second elongate rotatable shaft positioned forwardly of and at an angle to said first shaft, a second gear mounted on said second shaft and meshing with said first gear, and means coupling said second shaft to the differential gear mechanism.

2. A top mounted axle carrier unit for coupling a powered drive shaft to a pair of axle shafts disposed substantially perpendicularly thereto and coupled to a differential gear mechanism having a driven bull gear, comprising a rotatably mounted cross shaft disposed rearwardly of and above the axle shafts, a gear affixed on said cross shaft and meshing with the differential mechanism bull gear, a first bevel gear affixed on said cross shaft, a stub shaft rotatably mounted substantially perpendicularly to said cross shaft at a forward bearing point and a rearward bearing point, means coupling the forward end of said stub shaft to the powered drive shaft, a second bevel gear mounted on said stub shaft rearwardly of said cross shaft and meshing with said first bevel gear, positional bearing means at said rearward bearing point of said stub shaft for rotatably supporting said first shaft substantially without longitudinal displacement thereof, said rearward bearing point being disposed rearwardly of said second bevel gear, and second bearing means at said forward bearing point for rotatably supporting said stub shaft and facilitating longitudinal displacement upon expansion and contraction of said stub shaft.

References Cited in the file of this patent

UNITED STATES PATENTS

| | | |
|---|---|---|
| 2,156,739 | Schmitter | May 2, 1939 |
| 2,669,316 | Schjolin | Feb. 16, 1954 |
| 2,986,942 | De Lanty | June 6, 1961 |

FOREIGN PATENTS

| | | |
|---|---|---|
| 169,116 | Switzerland | July 16, 1934 |